UNITED STATES PATENT OFFICE.

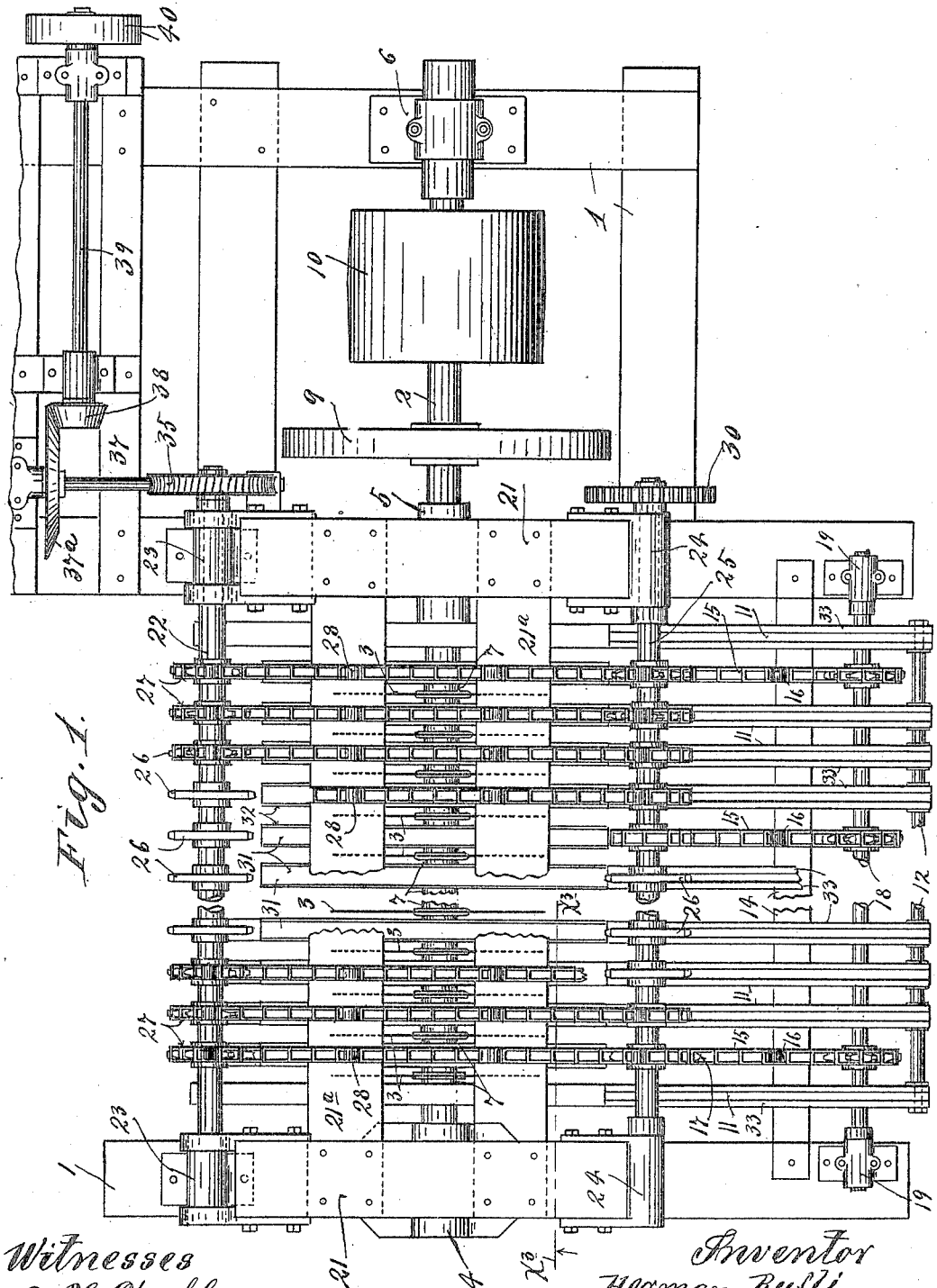

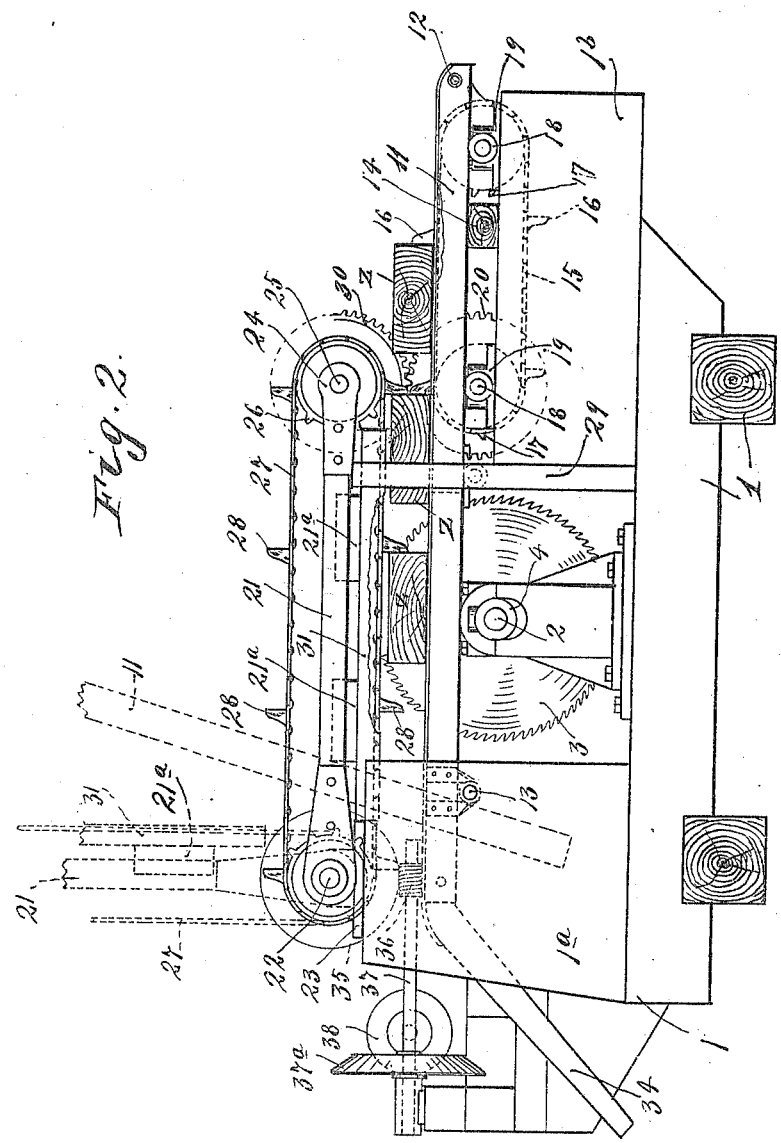

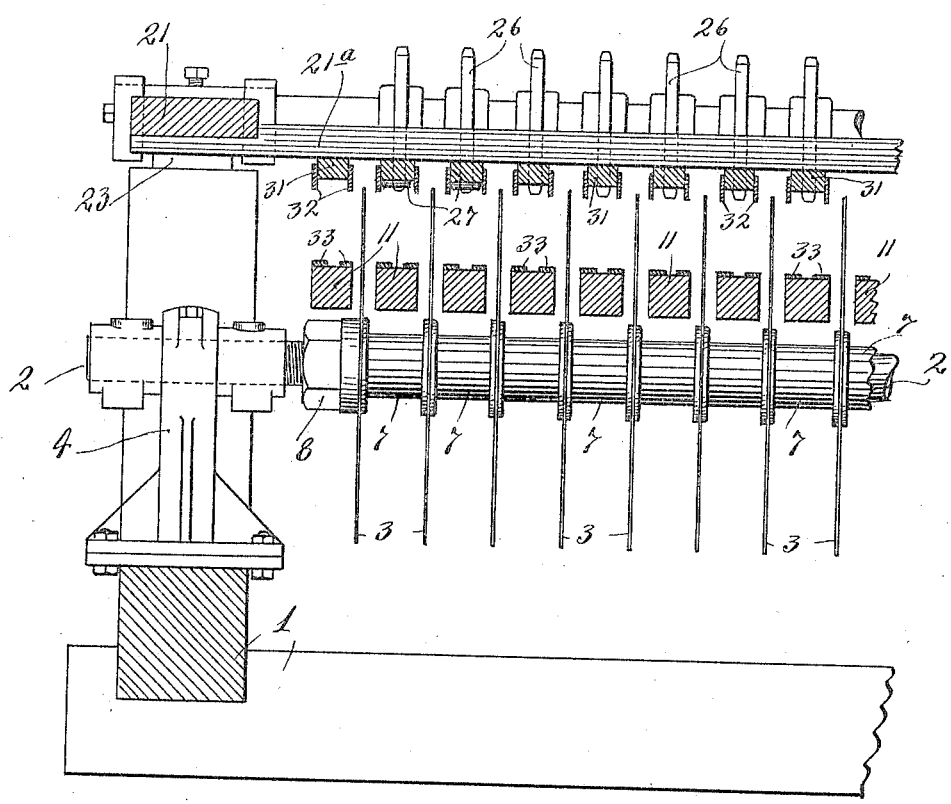

HERMAN RUFLI, OF INDIANAPOLIS, INDIANA, ASSIGNOR OF ONE-HALF TO ALEXANDER W. VAN HAFFTEN, OF MINNEAPOLIS, MINNESOTA.

BLOCK-SAWING MACHINE.

No. 811,332.   Specification of Letters Patent.   Patented Jan. 30, 1906.

Application filed March 17, 1905. Serial No. 250,516.

*To all whom it may concern:*

Be it known that I, HERMAN RUFLI, a citizen of the United States, residing at Indianapolis, in the county of Marion and State of Indiana, have invented certain new and useful Improvements in Block-Sawing Machines; and I do hereby declare the following to be a full, clear, and exact description of the invention, such as will enable others skilled in the art to which it appertains to make and use the same.

My invention has for its object to provide a simple and efficient machine especially adapted for use to saw planks into paving-blocks; and to this end it consists of the novel devices and combinations of devices hereinafter described, and defined in the claims.

The invention is illustrated in the accompanying drawings, wherein like characters indicate like parts throughout the several views.

Figure 1 is a plan view with some parts broken away, showing a machine designed in accordance with my invention. Fig. 2 is a side elevation of the said machine; and Fig. 3 is a section with parts broken away, taken approximately on the line $x^3 x^3$ of Fig. 1.

The numeral 1 indicates a heavy framework, as shown, made up of timbers. The numeral 2 indicates a saw-arbor, which carries a plurality of laterally-spaced circular saws 3 and is journaled in bearings 4, 5, and 6, rigidly but detachably secured on the framework 1. Spacing-thimbles 7 are placed between the saws, and the saws are clamped against the said thimbles by a nut 8, shown as applied to the arbor 2 near the left-hand end thereof, directions being taken with respect to Figs. 1 and 3. At its right-hand portion the arbor 2 is shown as provided with a fly-wheel 9 and with a pulley 10, over which pulley a power-driven belt (not shown) is adapted to run to impart rotary motion to the saws.

The planks (indicated by the character $z$) are fed laterally or edgewise to the saws over a deck made up of a plurality of bars 11, which bars are spaced apart and extend one between each adjacent pair of saws and preferably one outside of each end saw. At their receiving ends the several bars 11 are rigidly tied together and spaced apart by a spacing bolt or rod 12, and near their delivery ends they are pivotally mounted on a transverse shaft 13, supported by vertical projections $1^a$ of the framework 1 in such manner that the said feed-deck is adapted to be turned up, as indicated by dotted lines in Fig. 2, into an approximately vertical position above and clear of the saws. Normally the free end of said deck rests upon a transverse supporting-bar 14, rigidly secured on vertical projections $1^b$ of the framework 1.

The planks are adapted to be fed over the receiving portions of the deck 11 by a plurality of endless sprocket-chains 15, having at intervals projecting push-lugs 16, that engage with the plank. These sprocket-chains run over sprocket-wheels 17, carried by transverse shafts 18, mounted in bearings 19 on the frame projections $1^b$. The inner shaft 18 is provided at one end with a spur-gear 20.

Overlying the deck 11 is a frame 21, made up of a pair of laterally-spaced arms that are pivoted over the delivery portion of the deck 11 on a transversely-extended shaft 22, that is journaled in bearings 23, secured on the frame projections $1^a$. As shown, the side members of the pivoted frame 21 are tied together at their intermediate portions by bars $21^a$. To the free ends of the side members or arms of the frame 21 are secured bearings 24, in which is journaled a transverse shaft 25. The two shafts 22 and 25 are provided with laterally-spaced sprockets 26, arranged in alined pairs located in planes extending between the saws and outside the end saws. Sprocket-chains 27 run over the alined pairs of sprockets 26, and these chains, like the chains 15, are provided at suitable intervals with push-lugs 28. The free end of the pivoted frame 21 is loosely supported in a horizontal position, as shown, by vertical stop-bars 29, secured to the framework 1, as best shown in Fig. 2. At one end the shaft 25 is provided with a spur-gear 30, that normally meshes with the gear 20 of the inner shaft 18. The lower portions of the chains 27 run under presser-bars 31, rigidly secured to the tie-bars $21^a$ of the frame 21. These presser-bars 31 are preferably made channel form by means of rigidly-secured depending side strips 32, between which the chains run and by which they are held against lateral movements. The bars of the feed-deck 11 are, as shown, faced by metallic wearing-strips 33, upon which the planks $z$ directly bear. Said feed-deck 11, as shown, feeds onto a fixed inclined discharge-deck 34.

The shaft 22 at one end is shown as provided with a worm-gear 35, with which engages a worm 36, carried by a short countershaft 37, mounted in suitable bearings on the framework 1, and, as shown, provided with a beveled friction-wheel 37ª, with which engages a friction bevel-pinion 38, carried by a counter-shaft 39, also mounted in suitable bearings on the framework 1. The counter-shaft 39 carries a pulley 40, over which a power-driven belt (not shown) is adapted to run to impart rotary motion to said counter-shaft.

As is evident, the pivoted frame 21 and parts carried thereby are adapted to be turned pivotally upward, as indicated by dotted lines in Fig. 2. When the said frame 21 and the pivoted deck 11 are turned upward into the dotted-line positions indicated, free and unobstructed access is had to the saws. When the saw-arbor 2 is detached from its bearings, it may be lifted vertically upward and removed, and the saws may of course be removed from the arbor and readjusted and be reapplied thereto. Without removing the arbor from working position, but simply by removing the bearing 4 from working position, such clearance is afforded that the saws may be slipped off from and onto the arbor at will.

The endless primary feed-belt, made up of the chains 15, is driven from the endless secondary feed-belt, made up of the chains 27, through the intermeshed gears 20 and 30 on the shafts 18 and 25, respectively, and they are, as is evident, driven with a definitely-timed action the one feed-belt with respect to the other. When the overhead secondary feed-belt is turned into the vertical position indicated by dotted lines in Fig. 2, the gear 30 is of course carried out of mesh with the gear 20; but upon again being turned down said gears will again be thrown into engagement.

As is evident, the planks laid upon the primary feed-belt—to wit, upon the chains 15—will, by the driving-lugs 16, be positively forced over the deck 11 toward the saws and under the receiving portion of the overhead secondary feed-belt, made up of the plurality of chains 27, and by the driving-lugs 28 of said latter chains will be forced on over the deck 11 to the saws, past the saws, and off from the deck 11 and onto the inclined discharge-deck 34, from whence the sawed blocks will be discharged at a suitable point.

The machine above described while simple, strong, and durable has a high capacity for sawing planks into blocks and is generally efficient for the purposes had in view. The machine while especially designed for sawing planks into paving-blocks is capable of use generally for doing work of this character—that is, for sawing planks or boards into blocks or sections.

From what has been said it will of course be understood that the device described is capable of modifications within the scope of my invention as herein set forth and claimed. The device described may also be used to saw round posts.

What I claim, and desire to secure by Letters Patent of the United States, is as follows:

1. The combination with a feed-deck, and a plurality of laterally-spaced saws projecting through said deck, of a primary feed device and a secondary feed device, said primary feed device comprising a pair of sprocket-equipped shafts and coöperating sprocket-chains, one of said shafts carrying a spur-gear, and said secondary feed device comprising a frame, pivoted for movement into an inoperative position, a pair of sprocket-equipped shafts and sprocket-chains running over the sprockets of said shafts, the shaft at the free end of said frame having a spur-gear that normally meshes with the spur-gear of said aforenoted sprocket-shaft, substantially as described.

2. In a machine of the character described, the combination with a plurality of saws, on a common arbor, of a feed-deck, through which said saws project, said deck being pivoted for movement into a position clear of said saws, and an overlying feed device comprising a frame pivoted for movement into an inoperative position, and an endless feed-belt mounted on said pivoted frame, substantially as described.

3. In a machine of the character described, the combination with a plurality of saws on a common arbor, of a pivoted feed-deck made up of a plurality of bars passing between said saws, a primary feed-belt made up of a plurality of sprocket-chains, working between the bars of said deck and provided with push-lugs, and an overlying secondary feed-belt comprising a plurality of sprocket-chains having push-lugs, and which secondary feed-belt is pivotally mounted for movement to and from an operative position, substantially as described.

4. In a machine of the character described, the combination with a saw-arbor having a plurality of laterally-spaced saws, removable therefrom by movements longitudinally thereof, of a pivoted feed-deck having a plurality of bars extending between said saws, a pivoted frame overlying said feed-deck and said saws, sprocket-equipped shafts mounted on said pivoted frame, and sprocket-chains running over the sprockets of said shafts and provided with push-lugs working between said saws, substantiallly as described.

In testimony whereof I affix my signature in presence of two witnesses.

HERMAN RUFLI.

Witnesses:
ROBERT B. KEITH,
MARY L. EGAN.